United States Patent Office 3,641,192
Patented Feb. 8, 1972

3,641,192
PROCESS FOR THE PRODUCTION OF OXYMETHYLENE COPOLYMERS
France B. McAndrew, Summit, N.J., George W. Polly, Corpus Christi, Tex., and Walter E. Heinz, Greenville, S.C., assignors to Celanese Corporation, New York, N.Y.
No Drawing. Continuation-in-part of application Ser. No. 624,630, Mar. 27, 1967, which is a continuation-in-part of application Ser. No. 190,001, Apr. 25, 1962, both now abandoned. This application Sept. 13, 1968, Ser. No. 759,790
Int. Cl. C08g *1/16, 23/00*
U.S. Cl. 260—823  4 Claims

ABSTRACT OF THE DISCLOSURE

Moldable oxymethylene copolymers are produced by a novel method in which trioxane is reacted with a preformed oxymethylene copolymer, containing a larger portion of comonomer than is desired in the final product. Trioxane polymerization catalysts are employed and the product is of a higher molecular weight and contains lower comonomer content than the preformed copolymer.

This is a continuation-in-part of application Ser. No. 624,630 filed Mar. 20, 1967, now abandoned which is in turn a continuation in part of application Ser. No. 190,001, filed Apr. 25, 1962, now abandoned.

This invention relates to the production of acetal copolymers.

As is well known in the art, formaldehyde or trioxane may be polymerized to form solid moldable polyoxymethylene, and moldable oxymethylene copolymers may be prepared by the reaction of trioxane with various monomers. Polymerization of trioxane is described from example, in U.S. Pats. 2,989,505; 2,989,506; 2,989,507; 2,989,508; 2,989,509 and 2,989,510 of June 20, 1961, which disclose various techniques for the polymerization of trioxane and catalysts for use in such polymerization. Polymerization techniques and catalysts are also described in the article by Kern et al. Angewandte Chemie 73 (6) 177–186 Mar. 21, 1961.

Copolymers and methods for their production are disclosed in the aforesaid article by Kern et al., particularly in the section thereof entitled copolymerization of trioxane, and in various patents including U.S. Pat. Nos. 3,026,299 of Mar. 20, 1962; 3,012,990 of Dec. 12, 1961; 3,087,913 of Apr. 30, 1963; 3,072,609 of Jan. 8, 1963; and U.S. application Ser. No. 807,284 of Apr. 20, 1959, now abandoned; and 833,939 of Aug. 17, 1959, now abandoned; and Belgian Pat. No. 591,716 of June 9, 1960. A particularly useful moldable copolymer of high stability is disclosed in U.S. Pat. 3,027,352 of Mar. 27, 1962.

It is an object of this invention to provide a new and useful process for making acetal copolymers.

Another object of this invention is the provision of a new and useful process for reacting polymeric materials with trioxane to produce copolymers of the so-called "random" type.

Other objects of this invention will be apparent from the following detailed description and claims. In the description and claims all proportions are by weight unless otherwise specified.

In accordance with one aspect of this invention we have discovered that we may produce the known moldable copolymers of trioxane by a novel method in which trioxane is brought into reactive contact with an oxymethylene copolymer (hereinafter termed a "preformed copolymer") containing a larger proportion of comonomer than is desired in the final product. Surprisingly this reaction produces a trioxane copolymer of high molecular weight and low comonomer content. It is believed that during the reaction the previously formed oxymethylene copolymer is broken down into units which are incorporated along with the trioxane into the final copolymer chain.

The reaction of this invention is conveniently effected under the conditions known to be suitable for polymerization of trioxane, for example those given in the prior art mentioned above, preferably in the presence of a trioxane polymerization catalyst and at an elevated temperature. Particularly suitable trioxane polymerization catalysts are those of the cationic type described in the prior art mentioned above. It is preferred to use boron-containing cationic catalysts, especially those containing a boron atom connected directly to a fluorine atom. The proportions of catalyst, based on the weight of trioxane, may be those generally employed for polymerizing trioxane, (e.g., about 0.001–1%).

Advantageously the "preformed copolymer" contains at least two oxymethylene units linked to aliphatic carbon atoms of polyvalent units having adjacent carbon atoms. Such polymers may be, for instance, copolymers having in their chains the structure

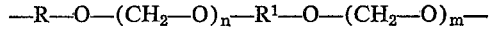

$$-R-O-(CH_2-O)_n-R^1-O-(CH_2-O)_m-$$

where $n$ and $m$ are each at least 1, 2, 3, 4, etc., and R and $R^1$ are divalent units, which may be the divalent units of any of the known moldable oxymethylene copolymers previously discussed (for example an alkylene unit, e.g. ethylene or propylene; or an alkyleneoxyalkyl or polyoxyalkylene unit, e.g. a $-CH_2CH_2-O-CH_2CH_2-$ or $-CH_2CH_2-(OCH_2CH_2)_n-$ unit; or one of the foregoing types of units which carries substituents other than alkyl, e.g. aryl, haloalkyl aryl, acetate or other carboxylate, ketone or aldehyde. Thus, one may use "preformed copolymers" whose units, other than oxymethylene, are the same as those described in the aforesaid publication of Kern et al. and in the copolymer patents and patent applications previously mentioned. R and $R^1$ in the above formula preferably have molecular weights below about 400.

Surprisingly even when the "preformed copolymer" does not contain oxygen in a ring and is essentially saturated it has been found to react with trioxane, being split at one or more oxymethylene linkages to form a copolymer in which the polyvalent units having adjacent carbon atoms are separated by more oxymethylene units than in the "preformed copolymer," and in which a plurality of the polyvalent units having adjacent carbon atoms are spaced along the copolymer chain.

The "preformed copolymer" may be produced conveniently by reacting with trioxane any of the comonomers described in the prior art discussed above. It may also be conveniently produced by the homopolymerization of cyclic formals, e.g. dioxolane or 1, 3, 5 trioxepane; U.S. Pat. No. 2,395,265 describes dioxolane polymers. The copolymers containing oxymethylene groups described in U.S. Pat. 2,870,097 of Jan. 20, 1959, or the copolymer described in Example 10 of U.S. Pat. No. 4,027,352 may also be used as the "preformed copolymer." For best results the "preformed copolymer" should be of the type which will dissolve in the trioxane phase under the conditions of reaction; thus, "preformed copolymers" which dissolve in trioxane, (or in mixtures of trioxane and any reaction solvent which is present) at temperatures in the range of, for example 40–200° C., are preferred. Lower molecular weight "preformed copolymers" are generally more soluble; those which are liquids (especially viscous liquids) or waxy solids at room temperature are particularly suitable. The use of very low "preformed copolymers," e.g. dimeric, trimeric and tetrameric materials, is also within the scope of this invention. The weight proportion of oxymethylene units in the "preformed copolymer" may vary, (e.g. in the range of about 10–90%) depending, for example, on the molecular weight of the other comonomer unit. It is convenient, for copolymers containing oxyalkylene (e.g. oxyethylene) or substituted oxyalkylene units, which units have adjacent carbon atoms, to use "preformed copolymers" containing more than 15 mole percent of such oxyalkylene or substituted oxyalkylene units. The "preformed copolymer" may contain more than one type of comonomer unit; e.g. it may be a terpolymer. Blends of two different "preformed copolymers" may be used (e.g. a blend of a copolymer having oxyethylene units and a copolymer having oxypropylene units) to produce, as final products, mixed copolymers or terpolymers.

The relative proportions of trioxane and "preformed copolymer" in the reaction mixture may be varied, depending on the nature of the "preformed copolymer" and of the desired copolymer. For most purposes, it is desirable to have present at least as much trioxane as "preformed copolymer." For the production of copolymers of most advantageous properties the sum of the amounts of trioxane and of the oxymethylene in the "preformed copolymer" should be at least five times, desirably at least ten times and preferably at least 30 times the amount of the combined comonomer present in said "preformed copolymer." The use of a very large excess, e.g. an amount of trioxane and combined oxymethylene equal to 300 times the amount of combined comonomer, may be economically undesirable.

The reaction time (for effecting the reaction of the trioxane and the "preformed copolymer") may be that employed for the usual polymerization of trioxane alone. It is preferred to carry out the reaction at least until the inherent viscosity of the resulting copolymer (measured as described in the example below) is at least 0.5.

The copolymers produced in accordance with this invention are moldable and may be employed for the same purposes as the oxymethylene copolymers of the prior art, and may be aftertreated and stabilized in the same manner as said copolymers.

The following example is given to illustrate this invention further.

EXAMPLE

A low molecular weight copolymer was produced from a reaction mixture made by adding 5 parts of cyclohexane and a catalytic amount of $BF_3$ to a blend of 100 parts of trioxane and 2.86 parts of ethylene oxide at 61° C. The amount of $BF_3$ was 50 parts per million (based on the amount of trioxane) and it, and the cyclohexane, were added as a mixture of said cyclohexane with a 30% solution of the $BF_3$ in di-n-butyl ether. The reaction mixture also contained, as impurities, 17 parts per million of water and 141 parts per million of acid (calculated as formic acid). The temperature of the stirred reaction mixture rose from 61° C. to 80° C. After 7 minutes the reaction was stopped by neutralizing the catalyst; this quenching was done by the addition of an excess of a solution of tri-n-butylamine in acetone of an excess of a solution of tri-n-butylamine in acetone (4 ml. of the amine per 1,000 ml. of acetone). The mixture was then distilled through a 30 tray distillation column; in this distillation acetone, cyclohexane and a major portion of the trioxane were taken overhead, then cyclohexane was added to the base so that the last traces of trioxane were removed overhead as the trioxane-cyclohexane azeotrope, leaving a residue of polymer dissolved in cyclohexane. This residue was charged to rota-film evaporator where volatiles were removed under a vacuum of 1 mm. HgA at a temperature below 52° C. until the sample attained constant weight. There were obtained 4.2 parts of a waxy copolymer containing about one half its weight of combined oxymethylene units and having a molecular weight in the neighborhood of 2,000.

19.6 parts of this waxy copolymer and 566 parts of redistilled trioxane were charged into a vessel surrounded by a constant temperature water bath and stirred continuously. To the stirred molten substantially anhydrous mixture there was added a solution of 0.085 part of boron fluoride di-n-butyl etherate (30% $BF_3$) in 28.3 parts of cyclohexane and then, 25 minutes later, a solution of 0.085 part of said boron fluoride di-n-butyl etherate in 2 parts of cyclohexane. The course of the reaction thereafter is tabulated below:

| Time (after second addition of $BF_3$-etherate) | Temperature of reaction mixture, ° C. | Remarks |
| --- | --- | --- |
| 15 seconds | 62 | Reaction mass turbid. |
| 2 minutes | 64 | |
| 5 minutes | 68 | Reaction mass quite thick. |
| 10 minutes | 70 | Reaction quenched with excess acetone containing 0.5% tri-n-butylamine. |

The hard solid copolymer formed during the reaction was separated from the quench solution and unreacted trioxane by filtration. It was then washed with fresh portions of acetone 7 times in a high-speed Waring blendor; after each washing the hard copolymer was filtered off from the wash liquor. The washed product was then dried in a vacuum oven (75° C. and 1–2 mm. HgA) for 16 hours. The yield of hard copolymer, after this treatment, was 70% based on the weight of trioxane and waxy copolymer charged.

The product had a crystalline melting point of 155–160° C. (determined by observation on the hot stage of a polarizing microscope) and an inherent viscosity of 0.7 (measured in 0.1% solution of the polymer in p-chlorophenol containing 2% alphapinene at 60° C.). It was a copolymer having a carbon content of 40.5% and having oxyethylene units distributed along the polymer chain. Analysis, by splitting the product by digestion with hydrochloric acid in butanol, indicates that the product contained not only isolated oxyethylene units attached by both valences to oxymethylene units but also di- and polyoxyethylene units along the chain.

The hard copolymer was milled with stabilizers (0.5% of bis(2-hydroxy-3-t-butyl-5-methyl phenyl) methane and 0.1% of cyanoguanidine) for 1 hour at 210–220° C. During this milling the copolymer lost 23% of its weight. The resulting product had an inherent viscosity of 0.7 and showed a weight loss of 2.9% when maintained at 230° C. for 45 minutes in an open vessel. In contrast when a homopolymer of trioxane (made in the presence of the same catalyst and having an inherent viscosity of 1.6) was milled with stabilizers, as described above, the homopolymer lost 41% of its weight during the milling and the weight loss of the stabilizer-containing product was 12% when it was maintained at 230° C. for 45 minutes in an open vessel.

While the foregoing example has described the use of batch reactions the process may be carried out continuously, as by feeding the "preformed copolymer" continuously into contact with a continuous stream of molten trioxane, passing the resulting blend through an elongated heated agitated zone where the reaction proceeds, and quenching the reaction mixture continuously as it emerges from the outlet of said elongated zone.

The process of this invention makes possible the production of copolymers in an easily controlled manner. The "preformed copolymer" can be produced under such conditions as permit reaction of the comonomer with the trioxane or other compound yielding oxymethylene units. Thereafter the "preformed copolymer" can be reacted with trioxane under conditions which promote the formation of long chain oxymethylene polymers. Also, if desired, the "preformed copolymer" may be produced at one location, where the comonmer is readily available, using relatively simple and inexpensive equipment, and the hard solid final copolymer may be produced at another location in equipment adapted for the handling of such solids. The "preformed copolymer" may be produced at a site where formaldehyde is available for its production and shipped to a second site where trioxane is available for reaction therewith.

It is to be understood that the foregoing detailed description is given merely by way of illustration and that many variations may be made therein without departing from he spirit of our invention.

Having described our invention what we desire to secure by Letters Patent is:

1. A process for the production of random high molecular weight moldable copolymers of trioxane having an inherent viscosity of at least 0.5 which comprises, reacting trioxane with a separately prepared preformed oxymethylene copolymer at a temperature from 40° C. to 200° C. in the presence of from about 0.001 to 1 percent, based upon the weight of the trioxane, of a cationic catalyst having a boron atom directly connected to a fluorine atom, said preformed oxymethylene copolymer being free of oxygen in a ring and having in its chain a structure represented by the formula:

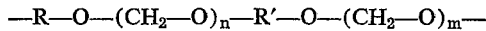

$$-R-O-(CH_2-O)_n-R'-O-(CH_2-O)_m-$$

wherein $n$ and $m$ are each at least 1 and R and R' are divalent alkylene units selected from the group consisting of ethylene and propylene, wherein said preformed copolymer contains more than 15 mole percent of said O—R and O—R' units, and wherein the sum of the amounts of trioxane and of the oxymethylene in the preformed copolymer is at least 5 times the amount of the combined comonomer in said preformed copolymer.

2. The process of claim 1 wherein said prepolymer is of liquid to waxy consistency.

3. The process of claim 1 wherein said divalent alkylene unit is ethylene.

4. The process of claim 3 wherein the sum of the amounts of trioxane and of the oxymethylene in the preformed copolymer is at least 30 times and not 300 times the amount of the combined comonomer present in said preformed copolymer.

References Cited

UNITED STATES PATENTS

| | | | |
|---|---|---|---|
| 3,194,788 | 7/1965 | Kullmar et al. | 260—67 FP |
| 3,256,246 | 6/1966 | Gutweiler et al. | 260—67 FP |

OTHER REFERENCES

Frommelt, Angewandte Chemie, vol. 69, No. 4 (1957), p. 148.

WILLIAH H. SHORT, Primary Examiner

L. M. PHYNES, Assistant Examiner

U.S. Cl. X.R.

260—67 FP